Dec. 16, 1958  J. F. HUGHES, JR., ET AL  2,864,750
METHOD AND APPARATUS FOR WATER TREATMENT
Filed Dec. 1, 1953
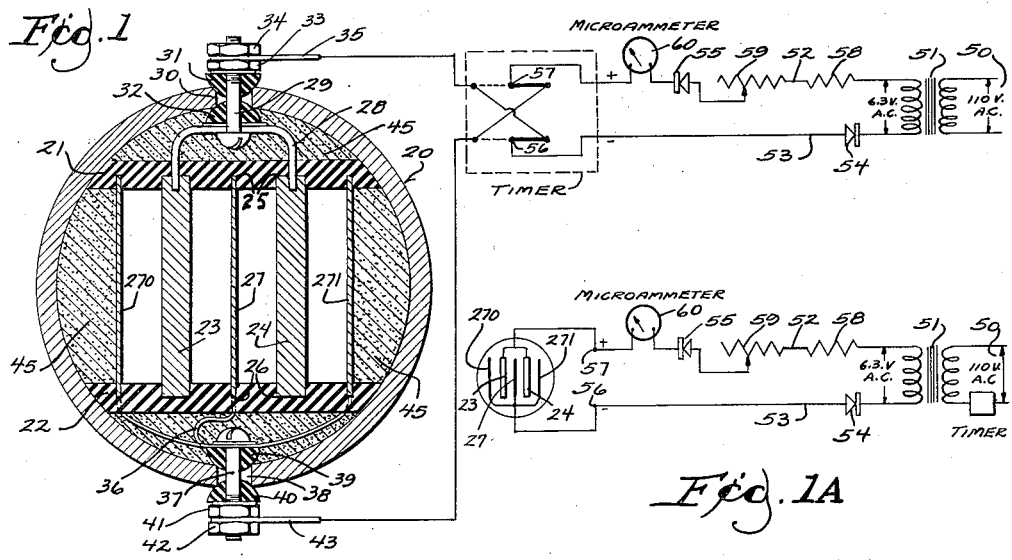
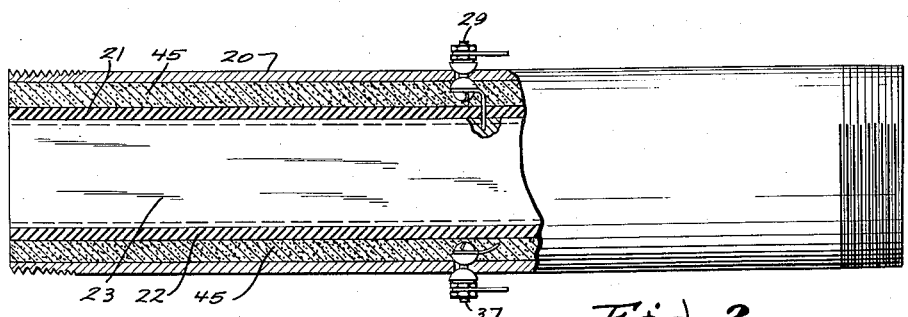
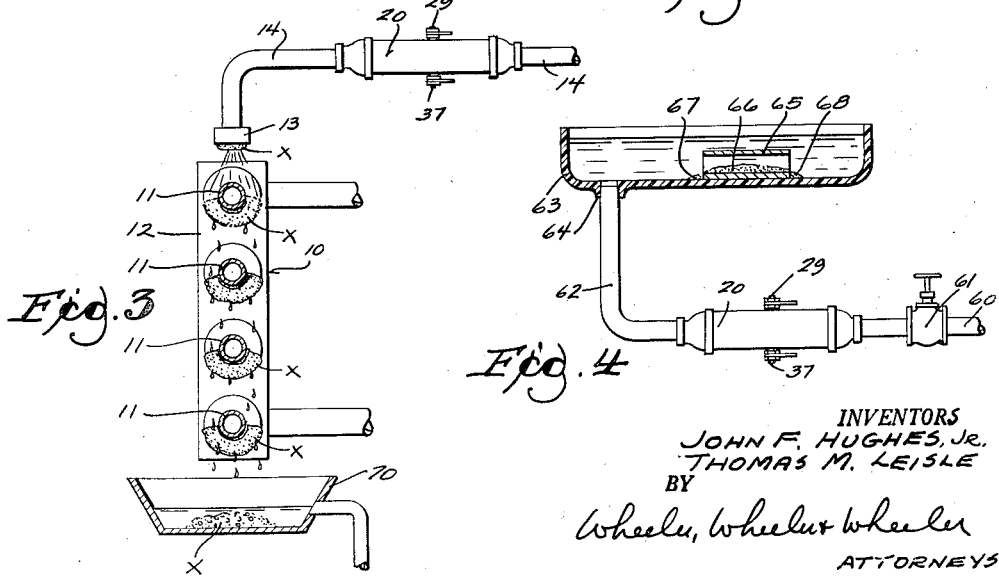
INVENTORS
JOHN F. HUGHES, JR.
THOMAS M. LEISLE
BY
Wheeler, Wheeler & Wheeler
ATTORNEYS

United States Patent Office 2,864,750
Patented Dec. 16, 1958

2,864,750

METHOD AND APPARATUS FOR WATER TREATMENT

John F. Hughes, Jr., and Thomas M. Leisle, Daytona Beach, Fla., assignors to Sta-lit Lighter Company, Milwaukee, Wis., a corporation of Wisconsin Application December 1, 1953, Serial No. 395,445

11 Claims. (Cl. 204—149)

This invention relates to method and apparatus for water treatment.

More particularly stated, this invention relates to a type of treatment whereby the water-borne contents lose their scale forming characteristics and in fact the scale previously deposited on water holding vessels and conduits lose its adherent characteristics with the result that the scale disperses in the treated water in the form of small particles of sometimes colloidal, easily removable silt.

The invention involves the exposure of the water to immersed electrodes, neither of which for practical consideration are consumed in the operation of the device, and each being selected for specific ampere hour effects such as $O_2$ adsorption and its reduction to hydroxyl ions, increased alkalinity about one electrode and film resistance to electric current flow at one electrode.

The apparatus includes immersed electrodes of specially selected, differing materials connected to a source of unidirectional current having certain characteristics. The electrodes are in addition to the normally grounded or ungrounded structural members incorporated in the feed conduit and liquid containing apparatus to be cleaned or protected.

Treatment of boiler water, water used in heat exchangers, air conditioners and evaporators, and water in domestic hot and cold water systems represents typical practical applications of the invention. In fact almost all places where calcification and scale formation from liquid takes place represent the field in which the invention is an answer to the problem relating to prevention or removal of scale.

In the drawing:

Fig. 1 is a cross section through a typical "unit" used in applying the method and shows schematically the electric circuit and components comprising an exemplification of the invention.

Fig. 1A is a view similar to Fig. 1 but showing a timer in the "line" as an on and off control.

Fig. 2 is a longitudinal section through the unit.

Fig. 3 is a diagrammatic view of a water cooled condenser in which cooling water is cascaded over condenser tubes and the water supply is provided with the treatment unit of the invention.

Fig. 4 is an elevation of a demonstration apparatus showing a tank and feed water inlet including the unit.

This is a continuation in part of application Serial No. 390,798, filed November 9, 1953, now abandoned.

In the following description of the invention, an illustrative use of it in the treatment of water for a water cooled condenser in a typical air conditioning system will be used as the environment, but as will be explained below, the invention may be used in a wide variety of environmental apparatus.

It is well known that the water supply usually available in domestic and civic water systems carries many types of soluble substances which under certain circumstances will be deposited upon the wetted surfaces of the conduits, tanks, boiler tubes, or other apparatus used to hold, store, or conduct the water. Much of this water-borne material has a tendency to form scale or a hard deposit with differing characteristics as to hardness and adherence to the wetted surfaces. As will be described below, the effect of the invention where it is used under circumstances where scale and objectionable deposits have heretofore prevailed, is to change the factors involved in scale formation and deposition of solids on the wetted surfaces that not only does the scale forming and deposition cease, but the deposits and scale therebefore formed on the wetted surfaces are softened and removed by gravity and by action of the moving water with the result that the surfaces such as the tubes, tanks and holders above referred to are clean and free from deposit and scale.

In Fig. 3, a water cooled condenser 10 has tubes 11 in which refrigerant passes on its way to an evaporator (not shown) in a manner well known in the refrigeration art. The refrigerant as it is received in the condenser from a compressor is expected to lose its heat of compression and means are provided for cascading cooling water down over the tubes 11 and into an accumulator whereby to remove the heat from the condenser tank 12. The supply of water is conducted to spray nozzles 13 by a supply pipe 14 connected to a source of water which may come from any convenient supply and which, as referred to above, carries with it such substances as calcium and many other scale forming ingredients. The method and apparatus of this invention is applied and installed so as to treat the water passing through the supply pipe to the nozzles.

In a particular installation in accord with the disclosure in Fig. 3, the nozzles 13 were incrusted with a substantial scale deposit around the orifice of each nozzle and the condenser tubes were coated with substantial deposits of scale X in accord with the normal operation of the condenser previous to the installation of the equipment now to be described.

At 20 in the supply pipe 14 is a treatment "unit" structurally incorporated in a length of pipe approximately twelve inches long and comprising a typical length of two and one-half inch galvanized iron pipe (see Figs. 1 and 2). Within the pipe and extending substantially throughout its length are two insulator plates 21 and 22 of such width and so curved along their margins that they are receivable into the pipe in the position shown in Fig. 1 where it will be seen that the two plates 21 and 22 are in spaced relation. Each of the plates is in the position of a chord across the circular inner circumference of the unit 20 and the broad surfaces of two plates are parallel with one another.

Each of the plates 21 and 22 is grooved longitudinally to receive spaced electrodes 23 and 24 which, when installed as shown in Fig. 1, complete a rectangular tube-like conduit through which water passing in the supply pipe 14 may be directed. At 25—26 the two insulator plates are grooved to receive an electrode plate 27 which must be metallic and is usually thinner than the electrodes 23 and 24. This electrode plate is spaced midway between the electrodes 23 and 24 and offers broad surfaces spaced from the broad surfaces of the electrodes 23 and 24.

It has been found upon repeated tests that the spacing between the electrodes 23 and 27 and the spacing between electrodes 24 and 27 should be approximately one-half inch and the spacing may be considerably less than this under some circumstances. If the unit be large enough to require additional electrodes as at 270—271, the insulator plates are grooved as indicated in Fig. 1.

The electrodes 23 and 24 are connected together by an electrically conductive clip 28 and this clip in turn is electrically connected and mechanically supported by terminal bolt 29. This bolt is centered and spaced from the margins of a relatively large bore 30 extending through the wall of the two and one-half inch galvanized pipe comprising the shell of the unit 20. The bolt is held in its centered position in the bore 30 by insulating washers 31 and 32 pulled snugly into the bore 30 by nut and lock nut 33—34 which hold lug 35 for electrical connection in the circuit described below.

Electrode plate 27 is connected marginally electrically at 36 to bolt 37 which is mechanically a counterpart of the bolt 29 and it is mounted somewhat similarly to bolt 29 centrally of bore 38 through the use of insulator washers 39 and 40. Nut 41 and lock nut 42 pull the washers 39 and 40 into the bore 38 and also hold electrical connecting lug 43.

The terminal bolts 29 and 37 and their connections with the electrodes are shielded from contact with the water. When the various parts of the unit 20 have been assembled as indicated, spaces "outside" of the insulators 21 and 22 and outside of electrodes 270 and 271 are filled with pitch 45 or other suitable waterproofing component to assure that water passing through the square conduit defined by the insulators and electrodes may not reach the electrical connections such as the clips 28 and 36 and the bolts which carry current to the lugs 35 and 43.

The unit 20 has its pipe-like shell threaded in the usual way for pipe connection in the supply pipe 14, and when so connected, the water passing to the nozzles 13 passes between the electrodes 23 and 24 on the one hand and 27 on the other in position for the type of treatment energized electrically as will now be described.

Electrodes 23 and 24 are made of carbon and electrodes 27 are made of iron, chromium, nickel, manganese, carbon and silicon in the particularly satisfactory unit 20 which has been used in the practical operation of the invention. It is believed that other materials may be used for these electrodes, but it is assumed that the materials of which the electrodes 23 and 24 are made would preferably be of different substances than electrode 27 since a theory of operation of this invention is that the normal electric cell action between the two types of electrodes, plus the ability of the electrodes to adsorb $O_2$ at a metallic face and a non-metallic face, respectively, has something to do with the success of the operation of the device.

As indicated in Fig. 1, the source of current to be supplied to the lugs 35 and 43 is derived from a source of 110 volt A. C. as shown at 50. A transformer 51 has an output providing 6.3 volts, the circuit for which through leads 52 and 53 is extended respectively through selenium cells 54 and 55 which, of course, act as rectifiers or are used in conjunction with a rectifier. In any event, the current is unidirectional and the leads are so connected that the connections at 56 and 57 are of minus and plus potential as marked in the drawings and no feed back is possible through the respective cells. At 58 a 15,000 ohm resistance is provided and at 59 a variable resistance providing a maximum of 100,000 ohms is included in the lead 52 to the plus connection at 57. For testing and empirical setting of the device, a 200 microammeter is provided at 60.

Normal electrolytic action between carbon plates 23 and 24 and the metallic plate 27 would establish the carbon plates as electrically positive and the metallic plate as electrically negative in relation to each other. The leads 52 and 53 as shown in Fig. 1 are connected to the unit 20 by connecting lead 53 (supplying negative potential) to the metallic plate; in other words, to the electrical connecting lug 43. Lead 52 providing positive potential is connected to the lug 35.

In the actual use of the components and circuit shown in Fig. 3 to treat water such as that flowing in the city mains in Daytona Beach, Florida, it has been found that the potential to be applied to the electrodes in the unit 20 shall be not less than .013 volt and not more than 1 (one) volt, the average being approximately .532 volt with a resulting current of not less than 10 microamps. and not more than 200 microamps., the average being 70 microamps. When the treatment is commenced and the adjustment of the variable resistance at 59 has been properly made to provide 70 microamps. to the electrodes 23—24—27, the treatment will continue for a considerable period of time as for instance 24 hours. It has been found that after a certain period of time, as applied to any given water conditions, the effectiveness of the apparatus decreases; therefore, to avoid this effect, it is necessary to reverse the polarity of the electrodes either by cutting off the impressed potential and thereby allowing the natural electrolytic current flow in the cell as shown in Fig. 1A or by reversing the polarity of the impressed current so that the natural electrolytic current flow is accelerated as shown in Fig. 1 where a double pole double throw switch in the secondary circuit will impress a potential on the electrodes similarly as in Fig. 1A or, at controlled intervals may impress that potential oppositely as will be apparent from the drawing. To do this automatically and at predetermined intervals, a timer adjustable as to time intervals has been provided at an appropriate point in the circuit, for instance as shown in Fig. 1. It is believed that this decrease in effectiveness had been caused by the change from the passive to the active state of the metallic electrode; that is, the loss of adsorbed oxygen at the metallic interface. Repeated tests seem to indicate that three factors are somehow involved and the cycling of the polarity of the electrode therefore is determined by consideration of the halogen, particularly the chloride content of the water, over-polarization of the anode and the loss of adsorbed oxygen at the cathode. Other factors involved in the determination of the cycle are the type of results desired, for it has been found that each change of polarity contributes to the overall results. To illustrate, in a commercial installation involving feed water for an air conditioning system, a two hour per day plus one day per week of reversed polarity was the cycle satisfactory for this operation. However, for the treatment of water to be used in washing glassware, described below, 14 hours of one polarity and 10 hours of the opposite polarity each day kept the process and apparatus effective. Also after hard scale had been removed from a hotel boiler a soft, thin, very white coating remained on the tubes. But after adjusting the cycle so that the opposite polarity was accentuated, the coating on the deposits changed from a white color to a yellow-gray color, but still remained soft and thin.

The material of the metal plate 27 is preferably an alloy containing iron, chromium, nickel, manganese, carbon and silicon to keep the oxide film at a minimum thickness and, incidentally, non-magnetic. It is also believed that the metallic electrode must contain a metal or metals of the transition groups of the periodic table, that is, a metal characterized by incomplete inner shell energy levels ("$d$" electron), and unfilled "$d$" energy bands, as this condition is said to be most conducive to adsorption of oxygen at the metallic interface. This material of which the plate 27 is made will hereinafter be called "adsorptive metal."

The plates 23—24 comprise carbon, carbon graphite or any other carbonaceous or some other non-metallic material. The selection of this material is determined by the non-ionizable characteristics in solution, ability to conduct electric current, and ability to adsorb gases. This material of which the plates 23 or 24 are made will hereinafter be called a "non-metallic conductor."

As stated above, the pipe used as the principal exterior structural element of the unit 20 is made of ordinary galvanized iron. Tests have shown that if copper is used the action is less pronounced. It appears to be important that the pipe shall be negative electrically with respect to the other electrodes.

As indicated above, Fig. 4 shows a demonstration apparatus in which the unit 20 is connected to a feed water supply pipe 60 with an ordinary globe valve 61 to control feed water to be passed through the unit and the ordinary pipe connections 62. A plastic tank 63 is in water-tight connection with the pipe connection 62 at 64 so that when valve 61 is opened for a short period of time, feed water may pass through the unit 20 and through the pipe connections 62 to fill the plastic tank 63. During the time that the water is passed into the tank 63 through the unit 20, the electrical connections as shown in Fig. 1 are complete through the timer and the water is passed between electrode plates 23—24 on the one hand, and the electrode plate 27 on the other hand. Even after the tank is filled and the valve 61 is closed, the circuit is complete through the timer and through the other electric connections to the electrodes so that they are continuously energized, except for the rest or reverse period under control of the timer, as described above.

Immediately upon the filling of the tank 63 with the water which has passed through the energized unit 20, an ordinary short piece of metal pipe 65, heavily encrusted interiorly with deposits, such as one would find in the interior of a furnace coil of a domestic hot water system, is placed as shown in Fig. 4 and is left immersed in the water. At the end of an 8 to 10 hour period it will be found that some of the encrustation of calcium and other salts will have been loosened as shown at 66 and will have settled by gravity in small piles at 67—68 upon the bottom of the tank 63. When the pipe 65 is picked up and tilted, loose silt will flow therefrom. The scale usually comes off as soft, flocculent, very small snowflake-like particles from totally enclosed surfaces, not exposed to air, such as the inside of a pipe or tank.

In a commercial installation of a unit 20, as in Fig. 3, the water passed through the pipe 14 and through the energized unit 20 caused a long standing accumulation of scale at X to be loosened from the nozzles 13 and from the condenser pipe 11 so as to be sluiced from these various units until they were clean. The particular commercial installation was made at a time when the very heavy accumulation of scale had decreased the efficiency of the apparatus at 11—13 and for some days after the initiation of the treatment using the unit 20, the accumulator pan 70, beneath the condenser 11, required removal of the scale X in shovelled quantities.

Long continued operation of a unit 20 indicates that the metallic plates 27 and the non-metallic electrodes 23—24 do not require replacement when so connected and they have an exceedingly long life; the limit of which has not yet been realized in any of the commercial installation thus far experienced. It appears to be important that the electrodes, metallic and non-metallic, as above described, are in addition to whatever natural grounded "electrode" there may be in the tubing, pipes or other structural apparatus of the water handling equipment to be served by the unit 20. It is demonstrable from the apparatus thus far experimentally used that if the electrodes 27 are dispensed with and the connection of the lead 53 at 56 is made directly to the boiler or condenser or other metallic equipment, so as to use them as an electrode connected to the rectified external current source, the electrolysis of the boiler or other equipment is rapid and destructive, whereas the unit 20, with its complement of electrodes 23—24 and 27, is completely protective of the metallic boiler, condenser or other equipment.

Tests have been made using water treated by the unit 20 in the usual electrically operated dishwashers and in the washing of glassware. The results have been surprising in that dishes and glassware washed with the treated water do not require towel drying or polishing, but will dry naturally without any of the usual spotting deposits of sediment. It is noteworthy that these beneficial results were not obtained until the unit had been used for a number of days adequate to clear up the previously accumulated deposits of scale and sediment in the tanks and piping and in the washing equipment. Thereafter the unit was set at one polarity while the washing equipment was not in use (during the night) and the polarity was changed while the washing was in progress.

We claim:

1. In an electrified apparatus for treatment of water a conduit for the passage of water to be treated, said conduit including a conduit shaped unit, dielectric mounting plates in said unit, a non-metallic conductor electrode mounted to said plates, an adsorptive metal electrode mounted to said dielectric plates whereby with said non-metallic conductor electrode and said dielectric plates to complete a conduit for passage of water through the unit, means providing an electric circuit including said electrodes to be completed through the water in the unit in series, said circuit being provided with a source of direct current, said source of electric current being connected with its positive pole to the non-metallic conductor and with its negative pole to the metallic electrode.

2. A water treatment system including a dielectric electrode support, a non-metallic conductor electrode and a non-magnetic adsorptive metal electrode spaced apart and supported by the electrode support, said electrodes having separate electrical connections for including the electrodes and water to be treated between them in an electric circuit, said system having a housing comprising a water conduit of electrically conductive material of negative electrical potential with respect to said electrodes.

3. A water treatment unit comprising a length of electrically conductive water conduit, dielectric lining for said conduit, spaced electrodes mounted to said dielectric lining whereby to provide water passage through the unit, said electrodes being spaced up to and not more than ½ inch from each other, one of said electrodes being made of non-magnetic adsorptive metal, another of said electrodes being made of non-metallic material, and separate electric leads connected respectively to said electrodes.

4. In an electrical system for treatment of water for removing scale forming constituents and for removal of scale deposited from water on a pipeline, a length of metal pipe insertable in the pipeline, electrical insulation with said pipe, electrodes of different materials mounted in spaced relation in said insulation to define a conduit for the flow of water therethrough in insulated relation relative to said pipe, one of said electrodes being non-metallic and another of said electrodes being non-magnetic adsorptive metal, a source of direct current, the positive pole of said current source being connected with said non-metallic electrode and the negative pole of said current source being connected with said metallic electrode during periods of treatment of the water, and means for limiting the potential and current applied to said electrodes to .013–1.0 volt and 10–200 microamperes.

5. In an electrical system for treatment of water for removing scale forming constituents and for removal of scale deposited from water on a pipeline, a length of metal pipe insertable in the pipeline, electrical insulation within said pipe, electrodes of different materials mounted in spaced relation in said insulation to define a conduit of up to ½" in width between said electrodes for flow of water therethrough in insulated relation relative to said pipe, one of said electrodes being non-metallic and another of said electrodes being metallic, a source of direct current, the positive pole of said current source being connected to said non-metallic electrode and the negative pole of said current source being connected with said metallic electrode during periods of treatment of the water, and means for limiting the potential and current applied to said electrodes to .013–1.0 volt and 10–200 microamperes.

6. In an electrical system for treatment of water for removing scale forming constituents and for removal of scale deposited from water on a pipeline, a length of metal pipe insertable in the pipeline, electrical insulation within said pipe, electrodes of different materials mounted in spaced relation in said insulation to define a plurality of conduits of up to ½" width and 12" in length for flow of water therethrough in insulated relation relative to said pipe, said electrodes being mounted longitudinally of said pipe and in alternating arrangement whereby a non-metallic electrode and a metallic electrode form the sides of each conduit, a source of direct current, means for connecting the positive pole of said source and the negative pole of said source of current respectively with said non-metallic electrode and said metallic electrode during periods of treatment of the water and for reversing such connections during periods of non-treatment of the water, and means for limiting the potential and current applied to said electrodes to .013–1.0 volt and 10–200 microamperes.

7. In an electrical system for treatment of water for removing scale forming constituents and for removal of scale deposited from water on a pipeline, a length of metal pipe insertable in the pipe, the pipeline and said pipe being electrically connected and grounded, electrical insulation within said pipe, electrodes of different materials mounted in spaced relation in said insulation to define a plurality of conduits of up to ½" width for flow of water therethrough in insulated relation relative to said pipe, said electrodes being mounted longitudinally of said pipe and in alternating arrangement whereby a non-metallic electrode and a metallic electrode form the sides of each conduit, said metallic electrode being of stainless steel consisting of iron, chromium, nickel, manganese, silicon and carbon, a source of direct current, means for connecting the positive pole of said source and the negative pole of said source of current respectively with said non-metallic electrode and said metallic electrode during periods of treatment of the water and for reversing such connections during periods of non-treatment of the water, and means for limiting the potential and current applied to said electrodes to .013–1.0 volt and 10–200 microamperes.

8. In an electrified apparatus for treatment of water, a conduit for the passage of water to be treated, said conduit including a conduit shaped unit providing dielectric mounting means, a non-metallic conductor electrode mounted to said means, an adsorptive metal electrode mounted to said means in spaced relation thereto whereby with said non-metallic conductor electrode to provide a passage for water therebetween, an electric circuit including said electrodes to be completed through the water in the unit in series, said circuit being provided with a source of direct current, said source of electric current being connected with its positive pole to the non-metallic conductor and with its negative pole to the metallic electrode.

9. In an electrified apparatus for treatment of water, a conduit for the passage of water to be treated, said conduit including a conduit shaped unit providing dielectric mounting means, a non-metallic conductor electrode mounted to said means, an adsorptive metal electrode mounted to said means in spaced relation thereto whereby with said non-metallic conductor electrode to provide a passage for water therebetween, an electric circuit including said electrodes to be completed through the water in the unit, said circuit being provided with a source of direct current, said source of electric current being connected with its positive pole to the non-metallic conductor and with its negative pole to the metallic electrode, said circuit being provided with switching means to reverse the polarity of the current flowing through said electrodes.

10. The method of treating water for prevention of scale deposit on surfaces which are wetted by the water, said method including the exposure of water which is in aquatic communication with said water on said surfaces between two electrodes in a unit providing dielectric mounting means for the electrodes, one of said electrodes comprising a "non-metallic conductor" and the other comprising an "adsorptive metal" electrode spaced from said non-metallic conductor, providing a source of uni-directional current connected with its positive pole to the non-metallic conductor and its negative pole to the adsorptive metal electrode, and passing uni-directional current from said source through said electrodes and through the water between the electrodes without connecting the uni-directional current directly to said surfaces.

11. The method of removing previously deposited scale from surfaces of a water conduit or container which includes the immersion of the scale covered surfaces in a quantity of water, the exposure of at least a portion of the water between spaced electrodes immersed therein and mounted in a unit including a conduit provided with dielectric mounting means for the electrodes, said electrodes comprising respectively an adsorptive metal and a non-metallic conductor spaced apart to receive said portion of the water therebetween, and the connection of said electrodes in an electric circuit to be completed through said portion of the water and having a source of direct current at a potential ranging from 0.13 to 1.0 volt, said source of direct current having its positive pole connected to the non-metallic conductor and its negative pole to the adsorptive metal electrode.

References Cited in the file of this patent

UNITED STATES PATENTS

| 541,335 | Salzberger | June 18, 1895 |
| 645,419 | Davis et al. | Mar. 13, 1900 |
| 760,302 | Boucher | May 17, 1904 |
| 943,188 | Hartman | Dec. 14, 1909 |
| 1,959,531 | Hickman et al. | May 22, 1934 |
| 2,530,524 | Hlavin | Nov. 21, 1950 |

FOREIGN PATENTS

| 389,244 | Great Britain | Mar. 16, 1933 |
| 855,886 | France | Feb. 26, 1940 |

UNITED STATES PATENT OFFICE
CERTIFICATE OF CORRECTION

Patent No. 2,864,750                                  December 16, 1958

John F. Hughes, Jr. et al.

It is hereby certified that error appears in the printed specification of the above numbered patent requiring correction and that the said Letters Patent should read as corrected below.

Column 6, line 49, for "with" read -- within --; column 8, line 42, for "0.13" read -- .013 --.

Signed and sealed this 7th day of July 1959.

(SEAL)
Attest:

KARL H. AXLINE
Attesting Officer

ROBERT C. WATSON
Commissioner of Patents